United States Patent
Jalloul et al.

(10) Patent No.: US 9,143,376 B2
(45) Date of Patent: Sep. 22, 2015

(54) EFFICIENT TREE-BASED MIMO OFDM DETECTION

(71) Applicant: Broadcom Corporation, Irvine, CA (US)

(72) Inventors: Louay Jalloul, San Jose, CA (US); Mohammad Mansour, Beirut (LB); Sam Alex, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/018,077

(22) Filed: Sep. 4, 2013

(65) Prior Publication Data

US 2015/0063498 A1    Mar. 5, 2015

(51) Int. Cl.
*H04L 27/26*    (2006.01)

(52) U.S. Cl.
CPC .................................. *H04L 27/2649* (2013.01)

(58) Field of Classification Search
CPC ..... H04L 5/0005; H04L 5/0007; H04L 5/001; H04L 27/265; H04L 27/2652; H04L 27/2653; H04L 27/2771; H04L 27/2672; H04L 27/2686; H04L 27/2647; H04L 27/2649

USPC ................ 375/260, 262, 265, 267, 340, 341; 370/208, 210
See application file for complete search history.

(56) References Cited

U.S. PATENT DOCUMENTS

| | | | |
|---|---|---|---|
| 8,903,027 B1 * | 12/2014 | Wu et al. ........................ | 375/341 |
| 2006/0245349 A1 * | 11/2006 | Vrcelj et al. ................... | 370/210 |
| 2010/0272196 A1 * | 10/2010 | Mansour et al. ............... | 375/260 |
| 2012/0207257 A1 * | 8/2012 | Park et al. ...................... | 375/348 |
| 2013/0034191 A1 * | 2/2013 | Sakai et al. .................... | 375/316 |

* cited by examiner

*Primary Examiner* — Young T Tse
(74) *Attorney, Agent, or Firm* — Sterne, Kessler, Goldstein & Fox P.L.L.C.

(57) ABSTRACT

Systems and methods are provided for efficient tree-based detection of multi-carrier modulated signals, such as Orthogonal Frequency Division Multiplexing (OFDM) symbols. In an embodiment, a plurality of signals occupying respective tones are received and processed to determine an order, based on a tone quality metric, for the plurality of signals. The plurality of signals are then dispatched to a pool of tree detectors in accordance with the order. In an embodiment, the order ensures that signals occupying higher quality tones, and requiring shorter detection times, are dispatched first to the pool of tree detectors. In another embodiment, a maximum runtime of busy tree detectors of the pool is updated based signal on actual detection times to exploit the time slack of early terminating detectors.

20 Claims, 5 Drawing Sheets

EFFICIENT TREE-BASED MIMO OFDM DETECTION

BACKGROUND

1. Technical Field

The present disclosure relates generally to Orthogonal Frequency Division Multiplexing (OFDM) symbol detection in a multiple input multiple output (MIMO) system.

2. Background Art

One disadvantage of conventional tree-based detection algorithms for multi-carrier modulated signals (e.g., OFDM) (with multiple antennas at the transmitter transmitting multiple spatial layers and multiple antennas at the receiver) is that the detection time can vary significantly from one tone to another due to varying channel conditions. For hardware implementation purposes, this is problematic because if the actual detection time varies from tone to the next tone, the detection throughput will be non-constant. One approach to solve this problem sets a fixed limit on the number of nodes that the tree detector can visit for a given tone. If the detector is able to complete detection within this fixed limit, it will return an optimal solution (e.g., Maximum Likelihood (ML) solution). Otherwise, the detector returns a best-effort suboptimal solution determined up to that point. A disadvantage of this approach is that it does not adapt the fixed limit from tone to the next tone and does not exploit the time slack of early terminating detectors.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
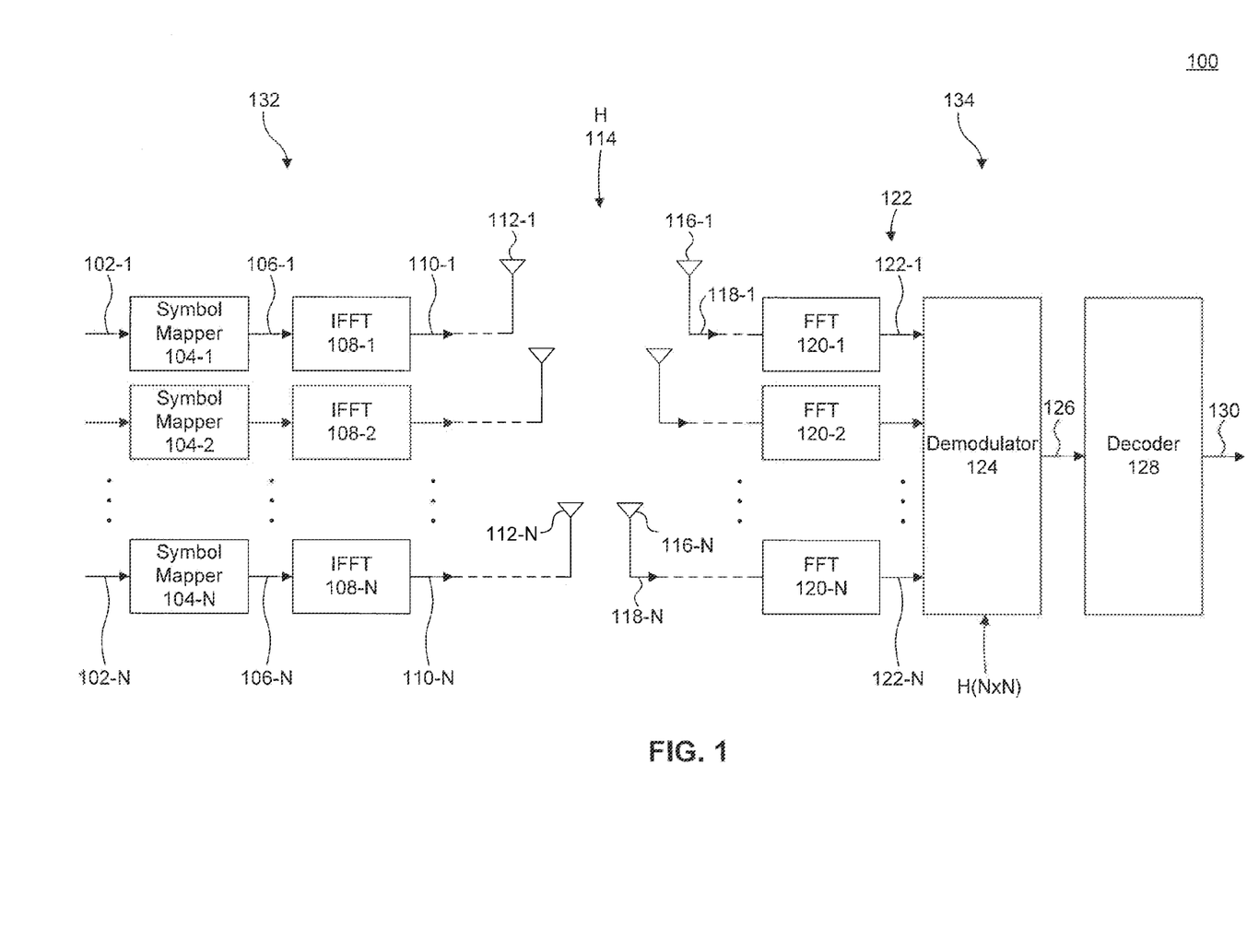
FIG. 1 illustrates an example environment in which embodiments can be practiced or implemented.

FIG. 1 illustrates an example environment 100 in which embodiments can be practiced or implemented. Example environment 100 is provided for the purpose of illustration only and is not limiting of embodiments. As shown in FIG. 1, example environment 100 includes a transmitter 132 and a receiver 134. Transmitter 132 can wirelessly transmit data over a wireless communication channel H 114 to receiver 134. For example, transmitter 132 can be part of a base station and receiver 134 can be part of a user equipment (UE), or vice versa.

For the purpose of illustration only and not limitation, transmitter 132 and receiver 134 are assumed to include, respectively, a plurality of transmit antennas and a plurality of receive antennas, thereby forming a Multi-Input-Multi-Output (MIMO) environment. However, embodiments are not limited to MIMO environments. Further, for simplification only, transmitter 132 and receiver 134 are assumed to have an equal number of transmit antennas and receive antennas (N).

In transmitter 132, a plurality of source symbols 102-1, . . . , 102-N (which can be source encoded and/or Forward Error Correction (FEC) encoded) are provided to a symbol mapper 104. Symbol mapper 104-1 to 104-N each maps a respective one of the source symbols 102-1, . . . , 102-N according to a respective constellation (e.g., 16-QAM, 64-QAM, etc.) to generate a plurality of complex symbols 106-1, . . . , 106-N. Complex symbols 106-1, . . . , 106-N are then provided to respective Inverse Fast Fourier Transform (IFFT) modules 108-1 to 108-N.

IFFT modules 108-1 to 108-N each acts on a respective one of complex symbols 106-1, . . . , 106-N to generate a respective one of IFFT output signals 110-1, . . . , 110-N. In an embodiment, complex symbols 106-1, . . . , 106-N are each a part of a respective complex symbol block, which results in a multi-carrier modulated signal (e.g., an OFDM symbol) or a portion thereof when acted upon by the respective IFFT module 108-1, . . . , 108-N. In the multi-carrier modulated signal, each complex symbol of the symbol block is modulated with a respective carrier signal to occupy a respective carrier or tone of the multi-carrier modulated signal. In an embodiment, because complex symbols 106-1, . . . , 106-N are processed in parallel by respective IFFT modules 108-1, . . . , 108-N, all of them occupy the same tone (frequency) within their respective multi-carrier modulated signals.

IFFT output signals 110-1, . . . , 110-N are then each further processed (e.g., converted from serial to parallel, augmented by a cyclic prefix (CP), converted from digital to analog, filtered, frequency up-converted, power amplified, etc.) before each being forwarded to a respective transmit antenna 112 for simultaneous transmission to receiver 134 over channel H 114.

In receiver 134, a plurality of receive antennas 116-1, . . . , 116-N each receives the N transmissions of IFFT output signals 110-1, . . . , 110-N by transmit antennas 112-1, . . . , 112-N to generate a respective input signal 118. Each input signal 118 includes a superimposition of IFFT output signals 110-1, . . . , 110-N.

After receive processing (e.g., low-noise filtering, frequency down-conversion, analog to digital conversion, filtering, and CP removal), each of input signals 118-1, . . . , 118-N is provided to a respective Fast Fourier Transform (FFT) module 120, which acts on input signal 118 to generate a respective FFT output signal 122. FFT output signals 122-1, . . . , 122-N are then provided to demodulator 124.

Demodulator 124 acts on of the FFT output signals 122-1, . . . , 122-N to generate soft-bit outputs 126 for each complex symbol. Soft-bit outputs 126 include a Log Likelihood Ratio (LLR) value for each bit of the complex symbol (e.g., 4 LLR values for 16-QAM, 6 LLR values for 64-QAM, etc.). Soft-bit outputs 126 from the demodulator 124 are then provided to a FEC decoder 128. Decoder 128 generates decoded bits 130.

In an embodiment, demodulator 124 can be a maximum-likelihood (ML) MIMO detector. More specifically, demodulator 124 can be tree-based detector (tree detectors) that perform ML MIMO detection using a closest-point search on a tree. In the following, a mathematical presentation of an example search algorithm that can be used to perform ML MIMO detection is provided. This example algorithm is provided for the purpose of illustration only and is not limiting of embodiments.

The objective of the closest-point search algorithm is to find the closest lattice point to a received symbol vector y in a 2N-dimensional lattice $Q^N$ under a distance metric. The received vector y is given by:

$$y = Hx + n \quad (1)$$

where H is the N×N channel matrix between the transmitter and the receiver, x is the N×1 transmit symbol vector, and n represents noise.

The distance metric is given by:

$$\min_{x \in Q^N} d(x) = \min_{x \in Q^N} \|y - Hx\|^2 \quad (2)$$
$$= \min_{x \in Q^N} \|\tilde{y} - Rx\|^2$$

where H=QR is an N×N channel matrix decomposed (by a QR decomposition) into a unitary matrix Q and an upper triangular matrix $R = [r_{ij}]_{N \times N}$, x is the transmitted N-dimensional symbol vector, and $\tilde{y} = Q^H y$ is the received N-dimensional symbol vector.

By exploiting the upper triangular structure of R, the distance $d(x) = \|\tilde{y} - Rx\|^2$ of a candidate lattice point $x = [x_1, \ldots, x_N]^T$ from $\tilde{y} = [\tilde{y}_1, \ldots, \tilde{y}_N]^T$ can be expanded as:

$$d(x) = \sum_{i=1}^{N} \left( \tilde{y}_i - \sum_{j=i}^{N} r_{ij} x_j \right)^2. \quad (3)$$

In one implementation, the minimum in equation Error! Reference source not found. can be computed using a brute force approach by exhaustively enumerating all the components of the lattice points $x = [x_1, \ldots, x_N]^T$ (in any arbitrary order), resulting in exponential complexity in N.

To reduce the amount of redundant computations, the Schnorr-Euchner (SE) algorithm computes the distance in equation Error! Reference source not found. more efficiently in a recursive fashion as:

$$d_i = d_{i+1} + \left( \tilde{y}_i - \sum_{j=i+1}^{N} r_{ij} x_j - r_{ii} x_i \right)^2, \quad i = N, N-1, \ldots, 1, \quad (4)$$
$$= d_{i+1} + e_i,$$

starting with the initial condition $d_{N+1} = 0$. The distance $d_1$ accumulated after N steps of the recursion corresponds to the distance d(x) of a particular lattice point $x = [x_1, \ldots, x_N]^T$. To cover all the lattice points in $Q^N$, for a particular choice of the first i components $x_1, \ldots, x_i$ of x, all the possible combinations of the remaining N−i components $x_{i+1}, \ldots, x_N$ must be trialed, and this must be done for all i=1, . . . , N.

In an embodiment, the recursion in equation (4) can be mapped to a tree with N levels, where each node has |Q| children. A node at level i has weight $d_i$, and branches to children nodes have associated weights $e_i$ for all the |Q| possible values of the constellation symbols $x_i$. A leaf node reached from the root by traversing branches $x_i$ at level i for i=N, N−1, . . . , 1 corresponds to the lattice point $x = [x_1, \ldots, x_N]^T$. Finding the ML solution corresponds to finding the leaf with the smallest weight metric.

Figure 2:
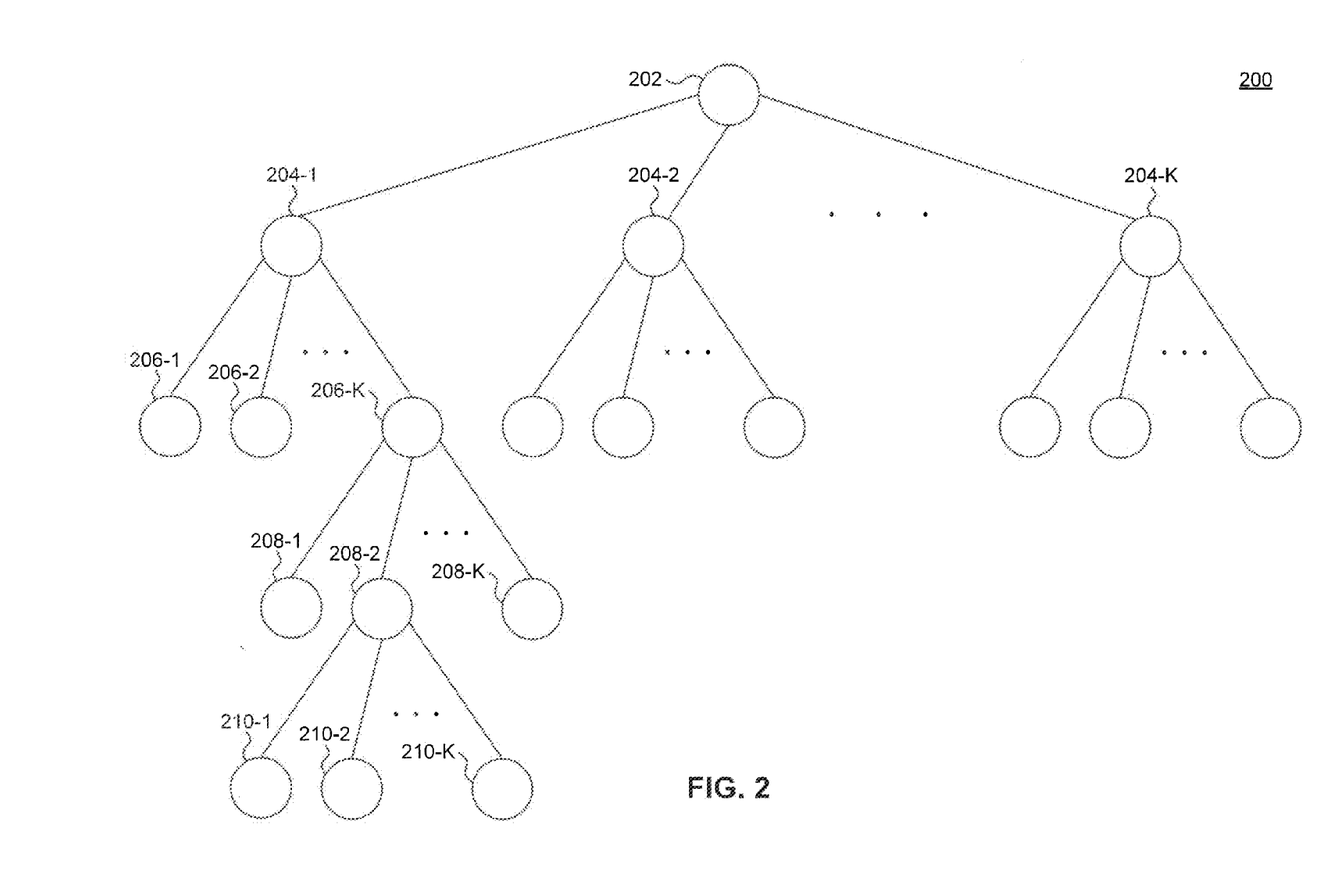
FIG. 2 illustrates a decision tree of an example tree detector.

FIG. 2 illustrates a decision tree 200 of an example tree detector. Example decision tree 200 is provided for the purpose of illustration only and is not limiting of embodiments. Example decision tree 200 can be used to find a ML solution for one tone (e.g., of an OFDM symbol). In practice, a detector includes a pool of tree detectors, which can process multiple tones in parallel using respective decision trees, such as decision tree 200.

For the purpose of illustration only, it is assumed that N is equal 4 (e.g., 4 symbols per tone) in decision tree 200. As such, the tree includes four tree levels. From an initial parent node 202, tree 200 provides K branch possibilities to traverse to reach the first level, provided by nodes 204-1, . . . , 204-K. The number K depends on the modulation scheme of the first symbol (e.g., for 64-QAM, where the first symbol includes 6 bits, $K = 2^6 = 64$). Similarly, tree 200 provides K (or a different number if a different modulation scheme is used for the second symbol) branch possibilities to reach the second level, provided by nodes 206-1, . . . , 206-K, from a first level node (e.g., node 204-1), K (or a different number if a different modulation scheme is used for the third symbol) branch possibilities to reach the third level, provided by nodes 208-1, . . . , 208-K, from a second level node (e.g., node 206-K), and K (or a different number if a different modulation scheme is used for the fourth symbol) branch possibilities to reach the fourth level, provided by leaf nodes 210-1, . . . , 210-K, from a third level node (e.g., node 208-2).

One disadvantage of such a tree-based detection algorithm is that the detection time (or time to find the ML point on the tree) is non-deterministic. The number of nodes traversed on the tree to detect one tone can vary significantly from another tone. This is mainly due to varying channel conditions, and depends particularly on the degree of orthogonality of the channel matrix H. For hardware implementation purposes, this is problematic because the actual detection time varies from tone to tone, leading to a non-constant (varying) detection throughput.

To solve this problem, typically a fixed limit is placed on the number of nodes that a detector can visit when searching for the ML solution for a given tone. If the ML solution is reached earlier, the detector can terminate before the limit; otherwise, the detector returns the best-effort sub-optimal solution found up to that point. The larger the number of nodes allowed to be traversed, the higher the probability is to find the ML point. A disadvantage of this approach is that the choice of the limit is fixed, and does not change from tone to tone. In another implementation, a hard limit is placed on the detection time of a set of tones comprising, for example, an OFDM symbol (for instance, 1200 tones in LTE for the case of 20 MHz bandwidth), rather than on detecting an individual tone. But, with the fixed limit approach, the time slack of early-terminating detectors is wasted and time borrowing between successive tone detections cannot be exploited.

Embodiments, as further described below, provide a solution for the above described problem by scheduling tones for detection according to a tone quality metric such that higher quality tones are processed first by a pool of tree detectors. Because detection time for higher quality tones is likely to be lower than an average detection time, more detection time can be made available for lower quality tones. As such, overall detection performance over a set of tones (e.g., OFDM symbol) can be improved. In another embodiment, a maximum allotted time (or a number of tree nodes visited) for a tree detector (or a pool of tree detectors that operate in parallel) can be adaptively changed by tracking actual detection times of previously processed tones, further improving overall detection performance. In a further embodiment, the number of employed tree detectors of a pool of tree detectors can be adaptively changed by tracking actual detection times of processed tones, turning on/off tree detectors to achieve a desired detection performance (detection speed and/or reliability) and/or to optimize power consumption.

Figure 3:
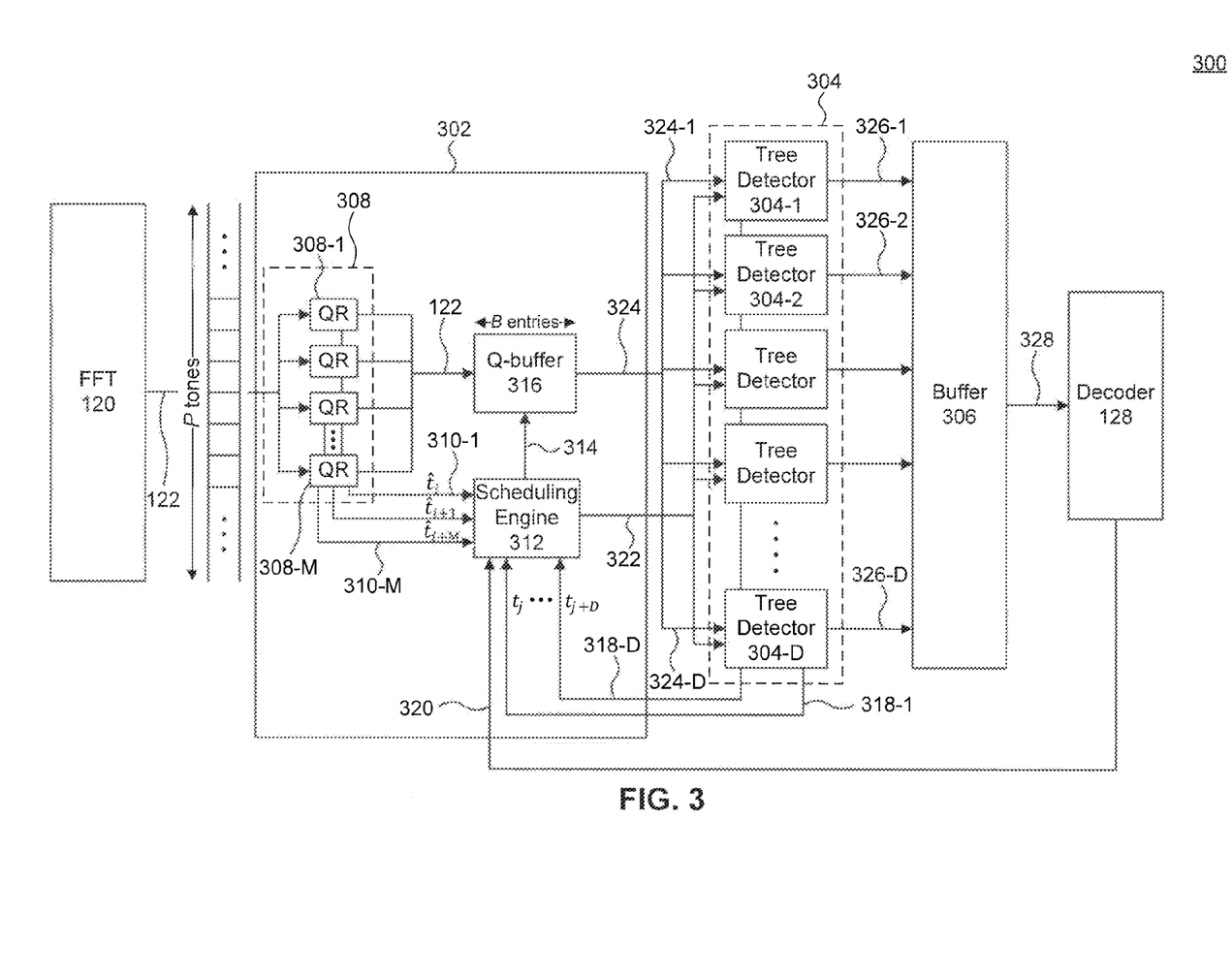
FIG. 3 is an example receiver according to an embodiment.

FIG. 3 is an example receiver 300 according to an embodiment. Example receiver 300 is provided for the purpose of illustration only and is not limiting of embodiments. As shown in FIG. 3, example receiver 300 includes a FFT module 120, a scheduler 302, a detector 304, an output reorder buffer 306, and a decoder 128. FFT module 120 is assumed to encompass FFT modules 120-1, . . . , 120-N described above with reference to FIG. 1 such that FFT output signal 122 includes all of FFT output signals 122-1, . . . , 122-N. It is also assumed that FFT 120 has a size P, such that signal 122 includes P tones. Decoder 128 is as described above with reference to FIG. 1. Components of example receiver 300 can be implemented on one or more processors (e.g., Digital Signal Processors (DSPs)).

As shown in FIG. 3, scheduler 302 is configured to receive FFT output signal 122 from FFT module 120. For the purpose of this description, it is assumed that FFT output signal 122 includes a plurality of signals, each occupying a respective tone of a multi-tone signal (e.g., OFDM symbol). In an embodiment, each signal of the plurality of signals includes a plurality of FFT output signals, such as FFT outputs signals 122-1, . . . , 122-N described above in FIG. 1. As such, each signal of the plurality of signals includes a plurality of superimposed symbols.

Scheduler 302, as further described below, determines an order for the plurality of signals contained in FFT output signal 122, based on a tone quality metric. The tone quality metric is a measure of the quality of a tone. According to embodiments, the tone quality metric can be derived in various ways and can take various representations. For example, the tone quality metric can be based on one or more of the following: a channel capacity derived from a channel estimate (H) of the tone; a channel condition number derived from the channel estimate of the tone; a QR decomposition of the channel estimate of the tone and the signal occupying the tone; a product of the columns of a channel matrix of the communication channel divided by a determinant of the channel matrix; decoder feedback regarding the tone (e.g., extrinsic LLRs for the tone from a turbo decoder, number of decoder iterations until convergence for the tone); a combination of a channel-based metric and decoder feedback; and the signal-to-noise ratio (SNR) associated with the tone. For example, in an embodiment, the channel condition and the SNR can be used in a look up table (calculated a priori) to determine an average number of tree nodes that need to be visited to detect the signal occupying a tone (or a detection time estimate).

In an embodiment, scheduler 302 is implemented in a UE. To compute the tone quality metrics for the tones, the UE stores various channel estimate computations typically performed and transmitted to the base station. For example, in an embodiment, the channel quality indicator (CQI), precoding matrix indicator (PMI), and rate indicator (RI) computations performed by the UE, which are typically performed at the UE and sent to the base station, can be stored at the UE and then used to compute the tone quality metrics for scheduler 302.

In the embodiment described below, scheduler 302 implements a tone quality metric that is derived from a QR decomposition of tones and that is represented using a detection time estimate. The detection time estimate of a signal represents a time estimate for demodulating by a tree detector all of the plurality of superimposed symbols contained in the signal. Higher quality tones have lower detection time estimates.

As shown in FIG. 3, scheduler 302 includes a detection time estimator 308, a scheduling engine 312, and a buffer 316. Detection time estimator 308 includes a pool of M QR decomposition modules 308-1, . . . , 308-M. Each of QR decomposition modules 308-1, . . . , 308-M is configured to receive and perform a QR decomposition on a respective signal of the plurality of signals (and its associated channel estimate), where each signal occupies a respective tone. In an embodiment, each of QR decomposition modules 308-1, . . . , 308-M acts on a received vector y for its respective signal and a channel matrix H of its respective tone. In an embodiment, QR decomposition modules 308-1, . . . , 308-M are QR modules. As such, each of QR decomposition modules 308-1, . . . , 308-M implements a QR algorithm with an appropriate column permutation on matrix H that generates an updated received vector $\tilde{y}=Q^H y$ and a triangular channel matrix R, in addition to a column permutation matrix P, for its respective tone. Based on this QR decomposition, each QR decomposition module 308-1, . . . , 308-M produces a detection time estimate 310 for its respective tone.

As described above, in other embodiments, detection time estimator 308 can determine the detection time estimates 310-1, . . . , 310-M differently. For example, detection time estimator 308 can determine the detection time estimate for a signal as a function of one or more of: a channel capacity derived from a channel estimate of a tone occupied by the signal; a channel condition number derived from the channel estimate of the tone occupied by the signal; and decoder feedback regarding the tone occupied by the signal.

In an embodiment, detection time estimator 308 is configured to receive in parallel M signals from FFT output signal 122, each of the M signals occupying a respective tone, and to forward each of the M signals to a respective one of QR decomposition modules 308-1, . . . , 308-M. The processing time ($\lambda$) of each QR decomposition module 308-1, . . . , 308-M is fixed. As such, detection time estimator 308 generates in parallel M detection time estimates 310-1, . . . , 310-M corresponding to the M signals. Detection time estimator 308 forwards detection time estimates 310-1, . . . , 310-M to scheduling engine 312 and the M signals (or FFT output signal 122) to buffer 316 at an arrival rate of M/$\lambda$. In an embodiment, buffer 316 is of size B, which may be equal to or different than M.

Scheduling engine 312 is configured to determine an order for the M signals based on detection time estimates 310-1, . . . , 310-M, and to dispatch the M signals from buffer 316 in accordance to the order to detector 304. In an embodiment, the order is such that the M signals are dispatched in an ascending order of detection time estimates from buffer 316 to detector 304. In another embodiment, scheduling engine 312 uses a control signal 314 to dispatch signals from buffer 316.

Detector 304 includes a plurality of tree detectors 304-1, . . . , 304-D, each configured to process one signal (tone) at a time to demodulate all of the superimposed symbols contained in the signal. In an embodiment, an output signal 324 of buffer 316 includes a plurality of signals 324-1, . . . , 324-D, each corresponding to a signal of the M signals stored in the buffer. Signals 324-1, . . . , 324-D can be forwarded one at a time or as a batch to detector 304. In an embodiment, if there are more idle detectors among tree detectors 304-1, . . . , 304-D than buffered signals in buffer 316, scheduling engine 312 dispatches all the buffered signals to idle detectors in parallel. Otherwise, if there are more buffered signals in buffer 316 than idle detectors among tree detectors 304-1, . . . , 304-D, then scheduling engine 312 selects the signals that require the smallest estimated detection times and dispatches them in parallel to the idle detectors.

In an embodiment, a dispatch policy as described below is used. By adopting this policy, scheduler engine 312 implements a maximization function of the processing time $t_i$ to detect the signal occupying the i-th tone.

At scheduling step k, the signal in the first position in buffer 316 is allocated a maximum runtime of $\bar{t}_k$ 322 by scheduling engine 312 and dispatched to an idle tree detector of tree detectors 304-1, . . . , 304-D (if and when one becomes available). The idle tree detector transitions to a busy state and starts the detection process of the signal. The tree detector can terminate earlier than $\bar{t}_k$ if the ML solution is found, but cannot run beyond the allotted time $\bar{t}_k$. In an embodiment, upon dispatching a signal to a tree detector, scheduling engine 312 further controls a number of tree levels used by the tree detector based on a detection time estimate associated with the signal. For example, scheduling engine 312 may not allow the tree detector to use all tree levels if it determines, based on the detection time estimate, that the tree detector will not find the ML solution within the maximum runtime.

When detection is complete or the maximum runtime $\bar{t}_k$ expires, the tree detector outputs a detection result 326 (which can include a set of LLRs for each complex symbol contained in the signal) to output buffer 306, and sends an actual detection time 318 (taken by the detector to detect the assigned signal) to scheduling engine 312.

When scheduling engine 312 receives actual detection time 318 from the tree detector, scheduling engine 312 moves to scheduling step k+1, in which scheduling engine updates the maximum runtime $\bar{t}_k$ based on actual detection time 318. In an embodiment, scheduling engine 312 updates the maximum runtime $\bar{t}_k$ using the equation:

$$\bar{t}_{k+1} = \frac{DT - \sum_{i=1}^{k} t_i}{N - k}. \qquad (5)$$

where $t_k$ corresponds to the actual detection time 318 received at the end of step k, D is the number of tree detectors 304-1, . . . , 304-D, N represents the number of tones (e.g., in an OFDM symbol) to be detected, and T represents the maximum allowed detection time for detecting all of the N tones.

In another embodiment, scheduling engine 312 then reports the updated maximum runtime to the busy ones of tree detectors 304-1, . . . , 304-D. If the updated maximum runtime has increased relative to the previous scheduling step, the busy tree detectors can spend more time on detection and have a better chance of finding the ML solution. Otherwise, the busy tree detectors can spend less time and have to terminate early with a less reliable solution.

In a further embodiment, the number of employed tree detectors among tree detectors 304-1, . . . , 304-D can be adaptively changed by scheduling engine 312 by tracking actual detection times of processed tones and/or actual OFDM symbol decoding time from the decoder. For example, if actual detections are on average lower than the maximum runtime and/or the actual OFDM decoding time is lower than T, then scheduling engine 312 can turn off some of tree detectors 304-1, . . . , 304-D to save power. Alternatively, if the tree detectors are not terminating within the maximum runtime and/or the detection result quality is lowered than desired, then any powered down detectors, if available, can be turned on, allowing the maximum runtime for each tone to be increased.

In an embodiment, at startup (k=0), each buffered signal can be allocated a mean detection time μ (determined empirically), or an estimated detection time $t_i$ determined by a QR decomposition module 308-1, . . . , 308-M, or simply an average time $\bar{t}_0$=DT/N. It is noted that in this case, as the scheduling steps k evolves, the sequence $\{\bar{t}_k\}$ becomes non-decreasing, and hence scheduling engine 312 tends to allocate more detection time for the detectors as k progresses, increasing their chance of finding the ML solution.

Returning to FIG. 3, detection results 326-1, . . . , 326-D from tree detectors 304-1, . . . , 304-D respectively are forwarded to output buffer 306. In an embodiment, detection results 326-1, . . . , 326-D are re-ordered in output buffer 306 to correspond to the original order of signals into buffer 316. For example, for an OFDM symbol, detection results 326-1, . . . , 326-D can be re-ordered according to tone number. Output buffer 306 then forwards the detection results as output 328 to decoder 128. Decoder 128 acts on output 328 as described above with respect to FIG. 1. In another embodiment, decoder 128 sends a feedback signal 320 to scheduling engine 312. Feedback signal 320 can include information regarding each signal (tone) for which a detection result 326 has been sent to decoder 128 and can be used to determine a decoding quality for the signal. For example, decoder 128 can indicate a number of iterations that were needed to converge on a solution for the signal. Scheduling engine 312 can use this feedback to update the maximum runtime accordingly. For example, if decoder 128 is taking too long to decode signals, scheduling engine 312 may increase the maximum runtime to result in higher reliability detection results.

Figure 4:
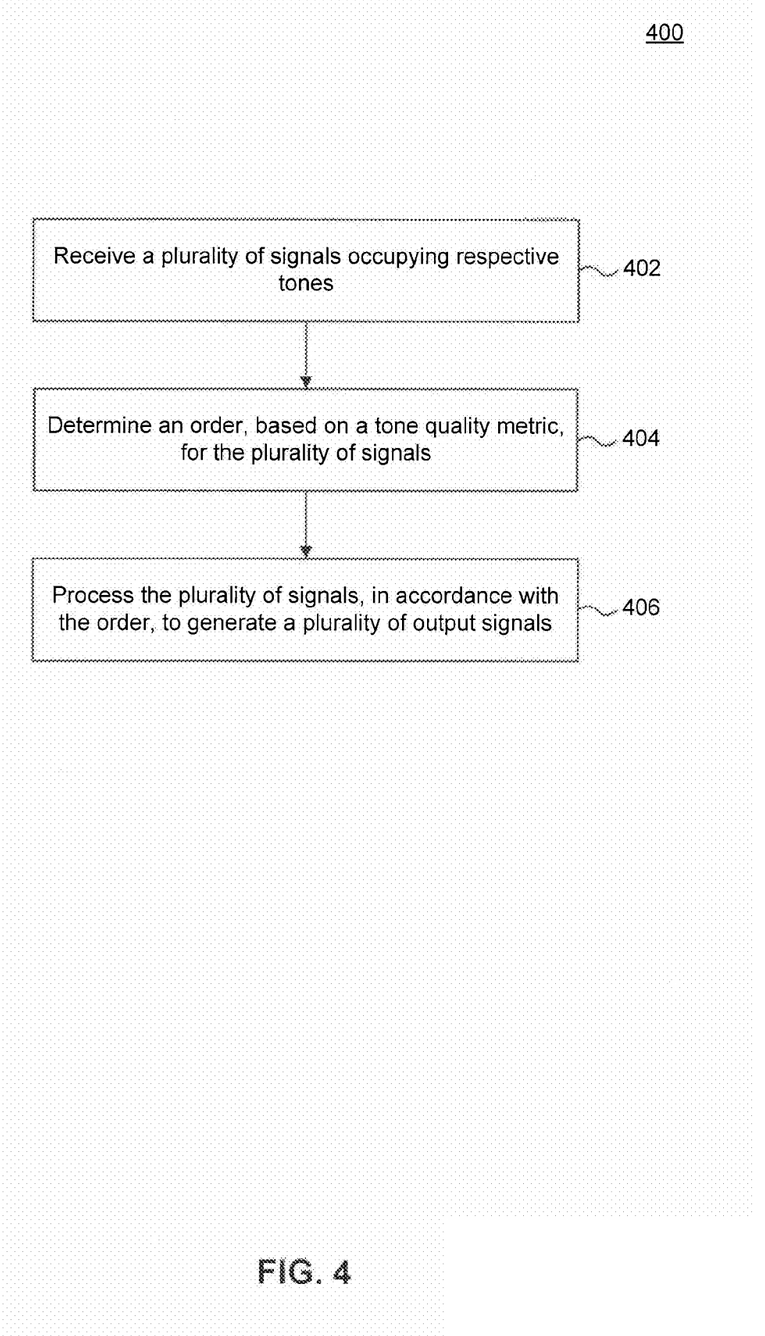
FIG. 4 is an example process according to an embodiment.

FIG. 4 is an example process 400 according to an embodiment. Example process 400 is provided for the purpose of illustration only and is not limiting of embodiments. Example process 400 can be performed by a receiver, such as example receiver 300 described above.

As shown in FIG. 4, process 400 begins in step 402, which includes receiving a plurality of signals occupying respective tones. In an embodiment, the signals can be part of an OFDM symbol. In another embodiment, each of the plurality of signals includes a plurality of superimposed symbols, transmitted simultaneously by a plurality of transmit antennas on the same tone.

Subsequently, process 400 proceeds to step 404, which includes determining an order, based on a tone quality metric, for the plurality of signals. In an embodiment, step 404 is performed by a scheduler, such as scheduler 302 described above with respect to FIG. 3. In an embodiment, determining the order for the plurality of signals includes generating respective detection time estimates for the plurality of signals; and determining the order based on the detection time estimates of the plurality of signals. In an embodiment, the order sorts the plurality of signals in an ascending order of detection time estimates.

In an embodiment, the detection time estimate for a signal of the plurality of signals can be determined as a function of one or more of: a channel capacity derived from a channel estimate of a tone occupied by the signal; a channel condition number derived from the channel estimate of the tone occupied by the signal; a QR decomposition of the signal and the channel estimate of the tone occupied by the signal; and from decoder feedback regarding the tone occupied by the signal.

Process 400 terminates in step 406, which includes processing the plurality of signals, in accordance with the order, to generate a plurality of output signals. In an embodiment, step 406 includes processing each signal using a tree detector as described above in FIG. 3. In another embodiment, step 406 further includes providing a maximum runtime to the tree detector; and receiving an actual detection time of the signal from the tree detector. The actual detection time can be the maximum runtime if the tree detector is unable to find a ML solution for the signal within the maximum runtime, or a time spent by the tree detector to find the ML solution. In a further embodiment, step 406 further includes updating the maximum runtime based at least in part on to the actual detection time of the signal.

Figure 5:
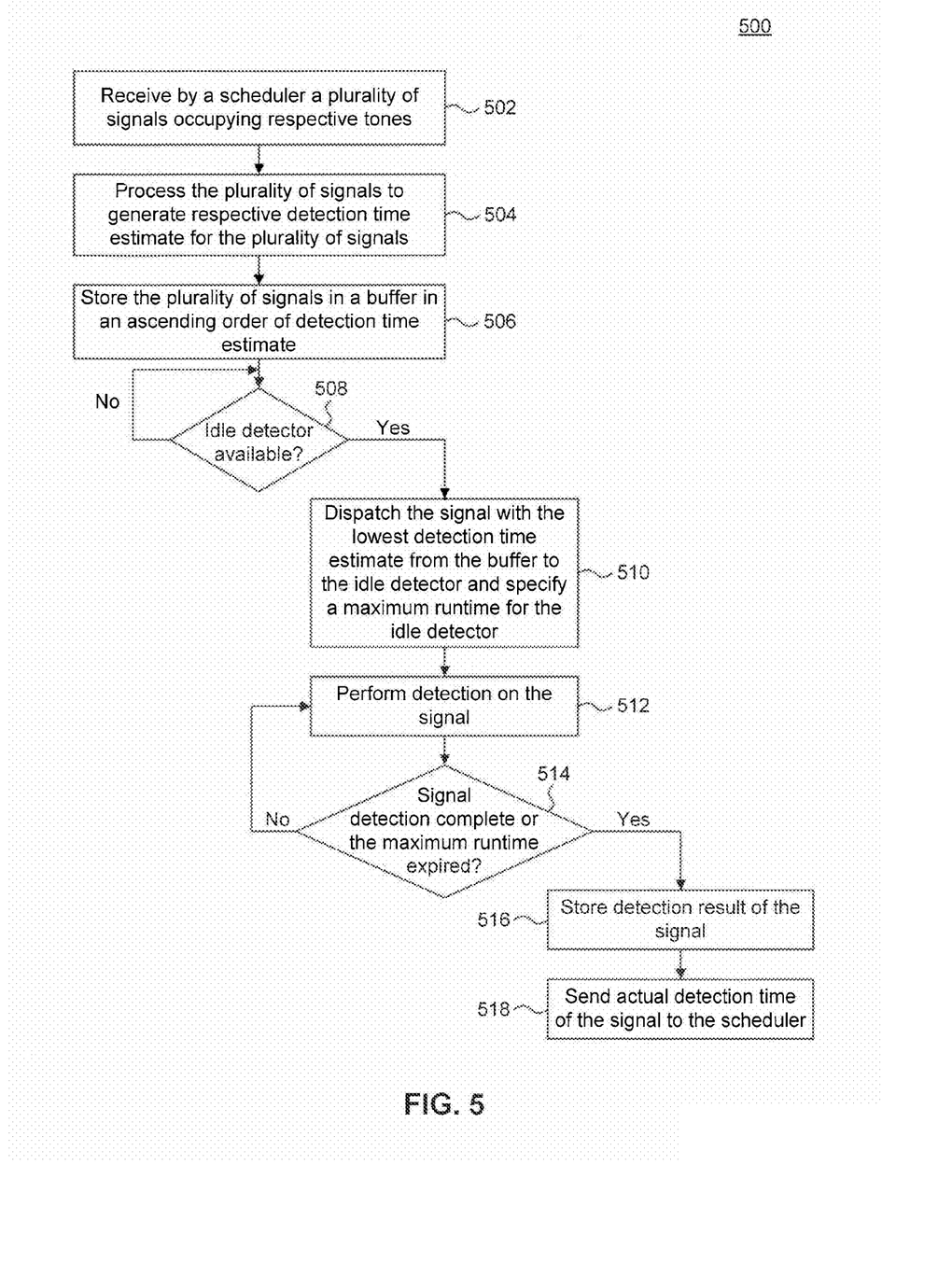
FIG. 5 is another example process according to an embodiment.

FIG. 5 is another example process 500 according to an embodiment. Example process 500 is provided for the purpose of illustration only and is not limiting of embodiments. Example process 500 can be performed by a receiver, such as example receiver 300 described above.

As shown in FIG. 5, process 500 begins in step 502, which includes receiving by a scheduler a plurality of signals occupying respective tones. In an embodiment, the signals can be part of an OFDM symbol. In another embodiment, each of the plurality of signals includes a plurality of superimposed symbols, transmitted simultaneously by a plurality of transmit antennas on the same tone. In an embodiment, step 502 is performed by a scheduler, such as scheduler 302 describe above with respect to FIG. 3.

Subsequently, process 500 proceeds to step 504, which includes processing the plurality of signals to generate respective detection time estimates for the plurality of signals. In an embodiment, each signal of the plurality of signals includes a plurality of superimposed symbols, and the detection time estimate for the signal represents a time estimate for demodulating all of the plurality of superimposed symbols by a detector. In an embodiment, the detection time estimate for a signal of the plurality of signals can be determined as a function of one or more of: a channel capacity derived from a channel estimate of a tone occupied by the signal; a channel condition number derived from the channel estimate of the tone occupied by the signal; a QR decomposition of the signal and the channel estimate of the tone occupied by the signal; a product of the columns of a channel matrix of the communication channel divided by a determinant of the channel matrix; and from decoder feedback regarding the tone occupied by the signal. In an embodiment, step 504 can be performed by a detection time estimator, such as detection time estimator 308 described above with respect to FIG. 3.

Process 500 then proceeds to step 506, which includes storing the plurality of signals in a buffer in an ascending order of detection time estimates. In another embodiment, process 500 does not include step 506, and the plurality of signals are stored in the buffer in the same order they are received in step 502.

Then, in step 508, process 500 includes determining whether an idle tree detector is available among a pool of detectors of the receiver. The detectors can be tree detectors as described above. If no idle tree detector is available, process 500 returns to step 508. Otherwise, process 500 proceeds to step 510, which includes dispatching the signal with the lowest detection time estimate from the buffer to the idle detector and specifying a maximum runtime for the idle detector. In an embodiment, steps 508 and 510 are performed at least in part by a scheduling engine, such as scheduling engine 312 described above with respect to FIG. 3.

Process 500 then proceeds to step 512, which includes performing detection on the signal. As described above, in an embodiment, the detection includes demodulating a plurality of superimposed symbols contained in the signal. Then, step 514 includes determining whether signal detection has been completed or the maximum runtime has expired. In an embodiment, steps 512 and 514 are performed at least in part by the detector processing the signal.

If the answer to step 514 is no, then process 500 returns to step 512, where signal detection continues. Otherwise, process 500 proceeds to step 516, which includes storing a detection result of the signal. In an embodiment, the detection result includes a set of LLRs for each complex symbol contained in the signal. If the maximum runtime has expired in step 514, then the detection result corresponds to the solution determined thus far by the detector (which may not be optimal). Otherwise, if the detector was able to complete the detection within the maximum runtime, then the detection result corresponds to the ML solution. In an embodiment, the detection result is stored in an output buffer, where detections results for various signals are re-ordered to match the order in which signals were received in step 502.

Process 500 terminates in step 518, which includes sending an actual detection time of the signal to the scheduler. In an embodiment, step 518 can be performed by the detector that processed the signal. If the detector was able to complete the detection within the maximum runtime, then the actual detection time is the time spent by the detector to complete the detection. Otherwise, the actual detection time can be the maximum runtime. In another embodiment, the detector sends the actual detection time only when it was able to complete the detection within the maximum runtime, and, otherwise, informs the scheduler that it was not able to complete detection within the maximum runtime. The scheduler uses the actual detection time, as described above, to update the maximum runtime for currently busy detectors of the pool of detectors.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A receiver, comprising:
a scheduler configured to receive a plurality of signals occupying respective tones corresponding to a communication channel and to determine an order, based on a tone quality metric, for the plurality of signals, the scheduler including:
a detection time estimator configured to generate respective detection time estimates for the plurality of signals; and
a scheduling engine configured to determine the order based on the respective detection time estimates of the plurality of signals, wherein the order sorts the plurality of signals in an ascending order of the respective detection time estimates; and
a detector configured to receive the plurality of signals from the scheduler in accordance with the order and to process the plurality of signals to generate a plurality of output signals.

2. The receiver of claim 1, wherein the detection time estimator is further configured to determine a detection time estimate for a signal of the plurality of signals as a function of one or more of: a channel capacity derived from a channel estimate of a tone occupied by the signal; a channel condition number derived from the channel estimate of the tone occupied by the signal; a QR decomposition of the signal and the channel estimate of the tone occupied by the signal; a product of columns of a channel matrix of the communication channel divided by a determinant of the channel matrix; and decoder feedback regarding the tone occupied by the signal.

3. The receiver of claim 1, wherein the detector comprises a plurality of tree detectors, and wherein the scheduling engine is further configured to dispatch, in accordance with the order, a signal of the plurality of signals to a tree detector of the plurality of tree detectors.

4. The receiver of claim 3, wherein the scheduling engine is further configured to provide a maximum runtime to the plurality of tree detectors, and wherein the plurality of tree detectors are configured to report to the scheduling engine actual detection times for respectively detected signals.

5. The receiver of claim 4, wherein the scheduling engine is further configured to update the maximum runtime in response to the actual detection times.

6. The receiver of claim 3, wherein the scheduling engine is further configured to control a number of tree levels used by the tree detector based on a detection time estimate associated with the signal.

7. The receiver of claim 1, wherein the tone quality metric associated with a tone of the respective tones is based on one or more of:
a channel capacity derived from a channel estimate of the tone;
a channel condition number derived from the channel estimate of the tone;
a QR decomposition of the channel estimate of the tone and a signal of the plurality of signals occupying the tone; and
decoder feedback regarding the tone.

8. A method, comprising:
receiving a plurality of signals occupying respective tones corresponding to a communication channel;
determining an order, based on a tone quality metric, for the plurality of signals, the determining including:
generating respective detection time estimates for the plurality of signals; and
determining the order based on the respective detection time estimates of the plurality of signals, wherein the order sorts the plurality of signals in an ascending order of the respective detection time estimates; and
processing the plurality of signals, in accordance with the order, to generate a plurality of output signals.

9. The method of claim 8, wherein generating the respective detection time estimates comprises determining a detection time estimate for a signal of the plurality of signals as a function of one or more of: a channel capacity derived from a channel estimate of a tone occupied by the signal; a channel condition number derived from the channel estimate of the tone occupied by the signal; a QR decomposition of the signal and the channel estimate of the tone occupied by the signal; a product of columns of a channel matrix of the communication channel divided by a determinant of the channel matrix; and decoder feedback regarding the tone occupied by the signal.

10. The method of claim 9, wherein the QR decomposition includes permutations of columns of the channel matrix of the communication channel.

11. The method of claim 8, wherein processing the plurality of signals comprises processing a signal of the plurality of signals using a tree detector.

12. The method of claim 11, wherein processing the signal comprises:
providing a maximum runtime to the tree detector; and
receiving an actual detection time of the signal from the tree detector.

13. The method of claim 12, further comprising:
updating the maximum runtime based at least in part on the actual detection time of the signal.

14. The method of claim 11, wherein processing the signal comprises:
controlling a number of tree levels used by the tree detector to detect the signal based on a detection time estimate associated with the signal.

15. A tone scheduler, comprising:
a detection time estimator configured to receive a plurality of signals occupying respective tones corresponding to a communication channel, and to generate respective detection time estimates for the plurality of signals; and
a scheduling engine configured to determine an order for the plurality of signals based on the respective detection time estimates, wherein the order sorts the plurality of signals in an ascending order of the respective detection time estimates, and wherein the scheduling engine is further configured to control a number of tree levels used by a tree detector based on a detection time estimate associated with a signal dispatched by the scheduling engine according to the order.

16. The tone scheduler of claim 15, wherein at least one signal of the plurality of signals includes a plurality of superimposed symbols, and wherein a respective detection time estimate for said at least one signal represents a time estimate for demodulating all of the plurality of superimposed symbols.

17. The tone scheduler of claim 15, further comprising:
a buffer configured to store the plurality of signals,
wherein the scheduling engine is further configured to dispatch the plurality of signals from the buffer to a detector, in accordance with the determined order.

18. The tone scheduler of claim 15, wherein the detection time estimator is further configured to determine the detection time estimate for a signal of the plurality of signals as a function of one or more of: a channel capacity derived from a channel estimate of a tone occupied by the signal; a channel condition number derived from the channel estimate of the tone occupied by the signal; a QR decomposition of the signal and the channel estimate of the tone occupied by the signal; a product of columns of a channel matrix of the communication channel divided by a determinant of the channel matrix; and decoder feedback regarding the tone occupied by the signal.

19. The tone scheduler of claim 15, wherein the scheduling engine is further configured to provide a maximum runtime to a plurality of tree detectors, and wherein the plurality of tree detectors are configured to report to the scheduling engine actual detection times for respectively detected signals.

20. The tone scheduler of claim 19, wherein the scheduling engine is further configured to update the maximum runtime in response to the actual detection times.

* * * * *